Figure 1:
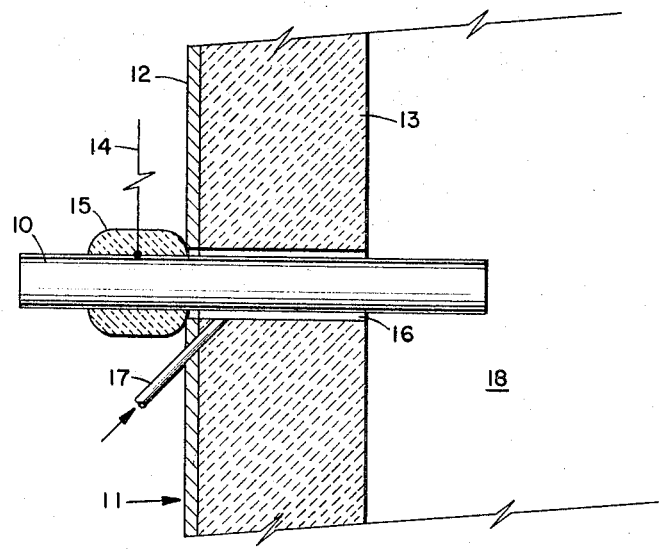

Feb. 21, 1967    B. V. MOLSTEDT ETAL    3,305,619

ELECTRODE INSTALLATION

Filed Aug. 7, 1963

Robert O Maak
Byron Victor Molstedt
Lawrence Joseph Delaune    INVENTORS

BY *George J. Silvey*

PATENT ATTORNEY

United States Patent Office 3,305,619
Patented Feb. 21, 1967

3,305,619
ELECTRODE INSTALLATION
Byron Victor Molstedt, Robert O. Maak, and Lawrence Joseph Delaune, Baton Rouge, La., assignors to Esso Research and Engineering Company, a corporation of Delaware
Filed Aug. 7, 1963, Ser. No. 300,493
5 Claims. (Cl. 13—20)

The present invention is concerned with an improved electrode installation for electrically heated beds. More specifically, it concerns an improved electrode installation for an electrically heated fluid bed used in gasifying hydrocarbons to coke and hydrogen. In particular, it deals with the elimination of the short-circuiting of the electrodes and the surrounding insulating walls in electrically heated gasification reactors which ultimately results in insulation failure.

Numerous methods for converting petroleum fractions into light gasiform products, e.g. hydrogen, have been advanced in the art. While, for example, the conversion of methane or refinery tail gas to hydrogen and coke is a well-known chemical reaction, the elevated temperatures required for desirable yields result in relatively high costs for supplying requisite thermal energy. Thus, numerous processes which might have been theoretically sound are impractical when analyzed from a commercial viewpoint.

Recent advances in this art have shown that in areas where the cost of electricity is relatively cheap, e.g., 6–8 mills/kwh., this reaction can be run economically by employing electrically heated, dense fluidized beds of solids maintained at the reaction temperature. The solids are heated by a controlled electrical potential or voltage applied across one or more portions of the solids bed, the resistance of the solids to electrical flow resulting in their being heated to the desired temperatures. The magnitude of the electrical potential or voltage is normally within the range of 0.1 to 1000 volts/inch, preferably 3–20 volts/inch, and is controlled to cause resistance heating of the solids without resulting in electrical spark discharges within the solids mass. The electrical power is supplied through a plurality of electrodes emersed into the side of a dense phase of the fluidized coke. The electro-fluid reactor operates in the general temperature range of 1900–2800° F. and in the pressure range of 5 to 500 p.s.i.g. Hydrocarbon feed is injected into the dense bed during the operation of the reactor and is converted quantitatively to coke and hydrogen gas after a residence time of from about 0.2 to about 30 seconds. The solids in the fluid bed are preferably fluid coke particles from a fluid coking process or coke produced in the present process.

However, these electrically heated fluidized bed reactors, while representing a great improvement over the previous methods used in the art, still are the source of serious operational problems. The principal difficulty which has beset operation of electrically heated fluidized beds at elevated temperatures has been electrical failure. This has ensued as the result of apparent breakdown, within or in the vicinity of the fluidized bed, of the electrical insulating properties of the structural elements separating electrodes which are operating at different potentials. Such breakdowns are caused by short circuits and have been known to melt even ceramic structural elements used to retain the electrodes and fluidized bed.

Short circuits arise when conducting material, such as coke, from the fluid bed is deposited near the electrode area on or within the insulating refractory material which makes up the wall of the reactor. This allows increased current to flow through the insulating material. As this current increases, it causes the temperature of the wall to increase since it is at a high original resistance level. In turn, as the temperature rises, the electrical resistance of the insulating walls will decrease (the electrical resistance of materials is inversely proportional to their temperature). Thus, more current will pass at the lower resistance further increasing the temperature. The result is a rapidly accelerating temperature rise which will end only when the heat removed from the insulating material balances that which is being generated electrically or until the material fuses.

It has now been found that failure of insulation materials in the reactor wall due to short circuits from the electrodes can be eliminated. This is accomplished by spacing the electrode a short distance from the insulating wall. A stream of gas is blown through the interstitial area and on into the reactor. This purge gas stream serves to remove heat from the insulating wall, thereby preventing the resistance-temperature cycle from accelerating in uncontrollable fashion. Furthermore, the force of the gas flow serves to keep fluid bed material, especially hydrocarbons, out of the voids or clearances on the surface of the insulating wall, thereby preventing accumulation of electrically conductive matter such as coke therein. The gas may comprise recycle product hydrogen, inert gases (such as nitrogen, helium, argon, etc.), steam, carbon dioxide, oxygen, air, mixtures thereof, or any gas that will not interact undesirably with the reactants or products of the gasification process. It may be desired to use a mixture of gases such as recycle product hydrogen with air or steam. The added air or steam will oxidize any carbon which might have adhered to the surface of the wall or electrode while the hydrogen present will allow high gas pressure to be maintained in the purge stream without using excessive amounts of the active air or steam components. This will minimize undesirable interaction of the purge gas mixture with the fluid bed material being processed.

It has further been found that an electrode installation wherein each electrode is individually shielded by a non-porous, non-conductive refractory material such as fused alumina, beryllia, etc., is less subject to electrical failure even when operating at gasification temperatures. The non-conductive sleeve fits around the electrode between the electrode and the insulating wall and acts as a barrier to electrical short circuits through the insulation liner. Additionally, the non-porous nature of the sleeve avoids the conduction problems which arise when conductive materials deposit on wall surfaces. Use of such sleeves allows a great reduction in the quantity of purge gas needed to prevent electrical failure. The combination of a non-porous, non-conductive sleeve with a gas purge is most desirable since it results in the longest possible electrode life at a minimal equipment and maintenance cost.

Other modifications of the present invention are possible. For instance, it is possible to utilize a non-conductive sleeve which is made of a porous refractory material such as alumina. In this embodiment, the purge gas is introduced through the porous sleeve into the reactor. The flow of the gas will act to prevent deposition of conductive material within the pores and will also serve to cool the sleeve and the neighboring electrode and insulation.

In order to lessen the amount of purge gas needed, it is also possible to utilize cooling means such as a cooling element or coil to effect the cooling of the insulation and the electrode. The gas, therefore, will be used in this embodiment in an amount sufficient only to prevent deposition. Any suitable fluid known in the cooling art may be used in the coil although water is considered most desirable due to its high specific heat, low cost and non-corrosiveness.

The various aspects of the present invention will be made more clearly apparent by reference to the following description and accompanying drawings.

Figure 2:
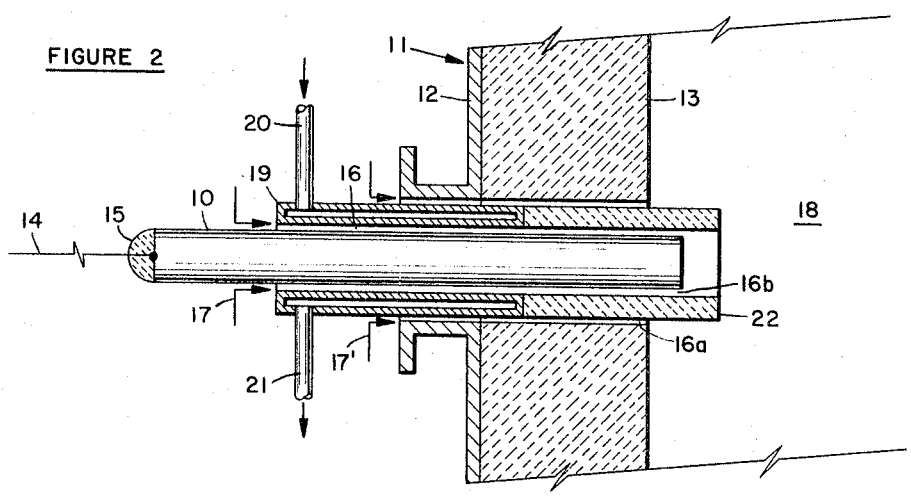

FIGURE 1 depicts an electrode installation in a fluid bed reactor, said reactor having inlet means for solids for the fluidized solids, inlet means for the hydrocarbons to be cracked, outlet means for the product and cracked vaporous products and a plurality of electrodes, said FIGURE 1 showing a gas purge system in vertical cross section of a portion of insulated wall of the reactor; and FIGURE 2 represents an electrode installation having a gas purge system, cooling element and a non-conductive, non-porous refractory sleeve in vertical cross section.

Turning now to FIGURE 1, solid elongated cylindrical electrode 10 is positioned to extend through a horizontal opening in the reactor wall 11. This wall is composed of two sections, the metal shell of the reactor 12 and insulating material 13. In a preferred embodiment, the surface of insulating material 13 which contacts the fluid bed is glazed so as to minimize the deposition of coke and the like particles thereupon. Power for electrode 10 is obtained from power supply 14. Clamp 15, which is made of an electrically non-conductive material or else is provided with insulation at points where it contacts electrode 10 or metal shell 12, holds electrode 10 in place and further acts as a seal against solids leakage and electrode connection. The electrode is fitted into the opening in wall 11 in such a manner so as to leave a space 16 between the surface of the electrode and the internal surface of the opening in the reactor wall. Purge gas inlet 17 allows gas to flow into space 16. The purge gas then will move between the interior surface of insulation 13 and electrode 10 until it is exhausted into the fluidized bed contained in the internal cavity 18 of the reactor.

In FIGURE 2, all parts common to the previous figure have been numbered identically. The new feature in FIGURE 2 is represented by a non-porous, non-conductive refractory sleeve 22 which is circumferentially positioned around the end of electrode 10. Sleeve 22 is made of refractory material such as fused alumina, beryllia, or the like. In this embodiment, a cooling element 19 having a coolant inlet 20 and a coolant outlet 21 is located circumferentially about electrode 10 but behind sleeve 22. Purge gas enters into area 16 through inlet 17. Sleeve 22 may be mounted so as to bisect area 16 into two concentric cylinders 16a and 16b. It is therefore necessary in that embodiment to utilize an additional purge gas inlet 17′ to supply gas to both areas 16a and 16b. However, sleeve 22 can also be mounted flush to the surface of insulation 13 leaving only a single purge area between sleeve 22 and electrode 10, e.g. 16b. It should be noted that sleeve 22 extends into cavity 18 beyond the reactor wall. This enhances its effectiveness as an electrical barrier between the electrode and the reactor wall. Furthermore, the said sleeve 22 may extend into cavity 18 a greater distance than electrode 10.

In a specific example of FIGURE 1 where 5,000 s.c.f. per hour of methane are cracked at a temperature of 2100° F. by passing electric current through a fluidized bed of coke particles to produce hydrogen and coke, the electrode 10, which is one of three electrodes, is about 30 inches long and about 6 inches in diameter. The entire reactor is about 50 feet long and 20 inches in diameter. Insulating material 13 is alumina castable and is about 14 inches thick.

The clearance of area 16 between the surface of electrode 10 and the internal surface of reactor wall 11 is about 0.03 inch. The rate of flow of hydrogen purge gas through inlet 17 and annular area 16 into the fluid bed in the reactor is about 1–10 c.f.m. at conditions.

In an example of FIGURE 2 using the same general reaction of FIGURE 1 the following operational values are utilized. Sleeve 22, a non-porous, non-conductive refractory material of the type previously described, is fitted about electrode 10 in such a manner as to leave a distance of 0.03 inch between sleeve 22 and electrode 10 and a distance of 0.03 inch between sleeve 22 and insulation 13. Purge gas consisting of hydrogen is passed through the resulting spaces (16a and 16b) at a rate of 20–200 c.f.h. at conditions, for example, 60 c.f.h. Furthermore, sleeve 22 extends into cavity 18 a distance of 0.75 inch beyond wall 11. Cooling element 19 is located circumferentially about electrode 10 in like position as sleeve 22 but posterior to sleeve 22 in relation to reactor cavity 18. The cooling element consists of inlet chamber 20 which is in close proximity at its interior position to insulation 13. Outlet chamber 21 is in close proximity to electrode 10 for the greater part of its length. Coolant in the form of water is circulated through element 19 at a rate of 1.0 g.p.m.

Summarily, the present invention offers the following advantages over apparatus heretofore known in the art.

(1) Effectively prevents electrical failure due to short circuiting between the electrodes through, or on the surface of, the insulation by means of relatively inexpensive materials.

(2) Deposition of foreign particles in and about the electrode installation is prevented.

(3) Cooling of the electrode and the adjacent insulation wall is accomplished, thereby preventing a resistance-temperature cycle runaway.

While the invention is more particularly adapted for use in electrically heated fluidized beds for gasifying hydrocarbons, it may also be used in electrically heated fixed and moving beds. Reaction processes employing electrically heated beds, such as the preparation of carbon disulfide, hydrogen cyanide, calcium carbide, and further processes, such as desulfurization, calcination, and steel manufacture, are additional areas wherein the present invention may be utilized to good advantage.

What is claimed is:

1. An electrode installation within a high temperature electro-fluid reactor comprising in combination (a) a reactor wall; (b) an opening through the reactor wall; (c) an elongated electrode mounted transversely with its forward end extended through the opening; (d) a cooling element, of diameter intermediate that of the electrode and wall opening, circumferentially surrounding said electrode, said cooling element being comprised in part of an electrically non-conductive refractory sleeve surrrounding the forward portion of the electrode, and in part of a thermally conductive sleeve provided with an internal passageway, said cooling element being mounted within the wall opening and positioned to provide an annular passageway between the internal surface of said cooling element and said electrode; and (e) gas inlet means adapted to provide purge gas to said annular passageways to effect cooling.

2. The electrode installation of claim 1 wherein said sleeve has an external diameter sufficiently smaller than the internal diameter of said reactor wall to form an additional annular passageway between the wall surrounding the opening through said reactor and the external surface of said sleeve, said additional annular passageway also being adapted to receive purge gas.

3. The electrode installation of claim 1 wherein said electrically non-conductive refractory sleeve portion of the cooling element is non-porous.

4. The electrode installation of claim 1 wherein the electrically non-conductive refractory sleeve portion of the cooling element is the only sleeve mounted within the wall opening.

5. The electrode installation of claim 1 wherein the electrically non-conductive refractory sleeve portion of said cooling element extends beyond the terminal forward end of the electrode.

(References on following page)

References Cited by the Examiner

UNITED STATES PATENTS

| | | | |
|---|---|---|---|
| 932,368 | 8/1909 | Becket | 13—17 |
| 1,542,716 | 6/1925 | Payne | 13—15 |
| 2,405,236 | 8/1946 | Rhoades et la. | 13—17 |
| 2,904,609 | 9/1959 | Schjelderup et al. | 13—17 |
| 2,960,555 | 11/1960 | Keefer | 13—6 X |
| 2,982,804 | 5/1961 | Reschke | 13—17 X |
| 3,009,974 | 11/1961 | Sekkelsten et al. | 13—25 |
| 3,027,447 | 3/1962 | Browning et al. | 219—75 |
| 3,148,239 | 9/1964 | Pinotti | 13—6 |

FOREIGN PATENTS 730,945  6/1955  Great Britain.

OTHER REFERENCES

German printed application 1,014,716, Aug. 29, 1957.

RICHARD M. WOOD, *Primary Examiner.*

V. Y. MAYEWSKY, *Assistant Examiner.*